(12) United States Patent
Erickson et al.

(10) Patent No.: US 12,076,944 B2
(45) Date of Patent: Sep. 3, 2024

(54) CONTINUOUSLY MOVING LINE FOR MAKING COMPOSITE LAMINATE PARTS

(71) Applicant: The Boeing Company, Chicago, IL (US)

(72) Inventors: Jordan S. Erickson, Federal Way, WA (US); Michael K. Louie, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/454,261

(22) Filed: Nov. 10, 2021

(65) Prior Publication Data

US 2022/0152948 A1    May 19, 2022

Related U.S. Application Data

(60) Provisional application No. 63/115,153, filed on Nov. 18, 2020.

(51) Int. Cl.
*B29C 70/38* (2006.01)

(52) U.S. Cl.
CPC .................. *B29C 70/388* (2013.01)

(58) Field of Classification Search
CPC ... B29C 70/388; B29C 70/386; B29C 70/384; B29C 70/382; B29C 70/38; B32B 41/00
See application file for complete search history.

(56) References Cited

U.S. PATENT DOCUMENTS

| | | | |
|---|---|---|---|
| 4,133,711 A | | 1/1979 | August et al. |
| 4,383,818 A | * | 5/1983 | Swannell ............... B29C 33/202 |
| | | | 425/546 |
| 8,336,596 B2 | | 12/2012 | Nelson et al. |
| 8,826,957 B2 | | 9/2014 | Shair et al. |
| 9,498,915 B2 | | 11/2016 | Bartel et al. |
| 2009/0120562 A1 | * | 5/2009 | Tsotsis ..................... B29C 70/42 |
| | | | 156/322 |
| 2011/0277935 A1 | | 11/2011 | Borgmann et al. |
| 2012/0006475 A1 | | 1/2012 | Colombo et al. |
| 2019/0286095 A1 | * | 9/2019 | Crivella .................. B23B 35/00 |
| 2020/0147905 A1 | * | 5/2020 | Shaw ..................... B29C 70/388 |

FOREIGN PATENT DOCUMENTS

| | | |
|---|---|---|
| DE | 102013212332 A1 | 12/2014 |
| EP | 3653369 A1 | 5/2020 |

OTHER PUBLICATIONS

European Patent Office Extended Search Report, dated Apr. 11, 2022, regarding Application No. EP21207522.0, 7 pages.
Netherlands Patent Office Written Opinion and Search Report with English Translation, dated Jul. 8, 2021, regarding Application No. NL2027436, 13 pages.
European Patent Office Communication, dated Mar. 28, 2023, regarding Application No. EP21207522.0, 6 pages.

* cited by examiner

*Primary Examiner* — George R Koch
(74) *Attorney, Agent, or Firm* — Yee & Associates, P.C.

(57) ABSTRACT

Composite laminate parts are made in a continuously moving line in which manufacturing operations are performed in individual work zones along the line.

20 Claims, 12 Drawing Sheets

CONTINUOUSLY MOVING LINE FOR MAKING COMPOSITE LAMINATE PARTS

CROSS-REFERENCE TO RELATED APPLICATION

This application claims the benefit of U.S. Provisional Patent Application Ser. No. 63/115,153, filed Nov. 18, 2020, and entitled "Continuously Moving Line for Making Composite Laminate Parts;" which is incorporated herein by reference in its entirety.

BACKGROUND INFORMATION

1. Field

The present disclosure generally relates to making composite laminate parts, and deals more particularly with a system and method for making parts in a continuously moving line.

2. Background

Volume production of composite laminate parts is typically carried out using batch processing in stationary locations. For example, a single laminator such as an automated fiber placement machine may be used to layup a batch of identical parts, one-at-a-time on mandrels located in a stationary cell within a production facility. This leads to an inefficient use of production floor space and mandrel utilization. Additionally, quality control becomes more challenging because detecting part nonconformities in a batch of parts is difficult and time-consuming.

It would therefore be desirable to eliminate the inefficiencies of batch processing of composite laminate parts while facilitating improved quality control through the use of a continuous production line.

SUMMARY

The disclosure relates in general to volume production of composite laminate parts, and more specifically to a continuously moving line for producing the parts.

According to one aspect, a system is provided for making composite laminate parts. The system comprises a plurality of work zones in which an operation is performed on the parts. A plurality of tools are provided that are continuously movable along a line through each of the work zones. A laminator is located in at least one of the work zones that is configured to apply composite material on the tool. A controller is provided for controlling movement of the platforms and operation of the laminators.

According to another aspect, a system is provided for making composite laminate parts. The system comprises a plurality of mobile platforms, and a moving line powertrain configured to move the mobile platforms continuously through each of a plurality of work zones. The system also includes at least one tool carried on each of the mobile platforms, and at least one laminator located in each of the work zones that is configured to apply composite material on the tool. A controller is configured to coordinate operation of the laminators with each other.

According to another aspect, a method is provided of making composite laminate parts. The method includes moving a plurality of tools along a line through each of a plurality of work zones. The method further includes laying up portions of each of the parts on the tools at each the work zones using automated laminators as the tools move along the line through each of the work zones.

According to a further aspect, a method is provided of making a composite laminate part, comprising moving a plurality of tools along a line passing through a plurality of work zones. The method also includes laying up at least portions of the part using a laminator located in at least work zone, and performing work on the part in one of the work zones after the part has been laid up.

One of the advantages of the continuously moving line for making composite laminate parts is that higher production rates may be achieved while increasing utilization of production equipment such as laminators and mandrels. Another advantage is that floor space may be better utilized. A further advantage is that part nonconformities may be more quickly detected, and adjustments made in manufacturing processes, thereby reducing part rework and/or scrap.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

DETAILED DESCRIPTION

Figure 1:
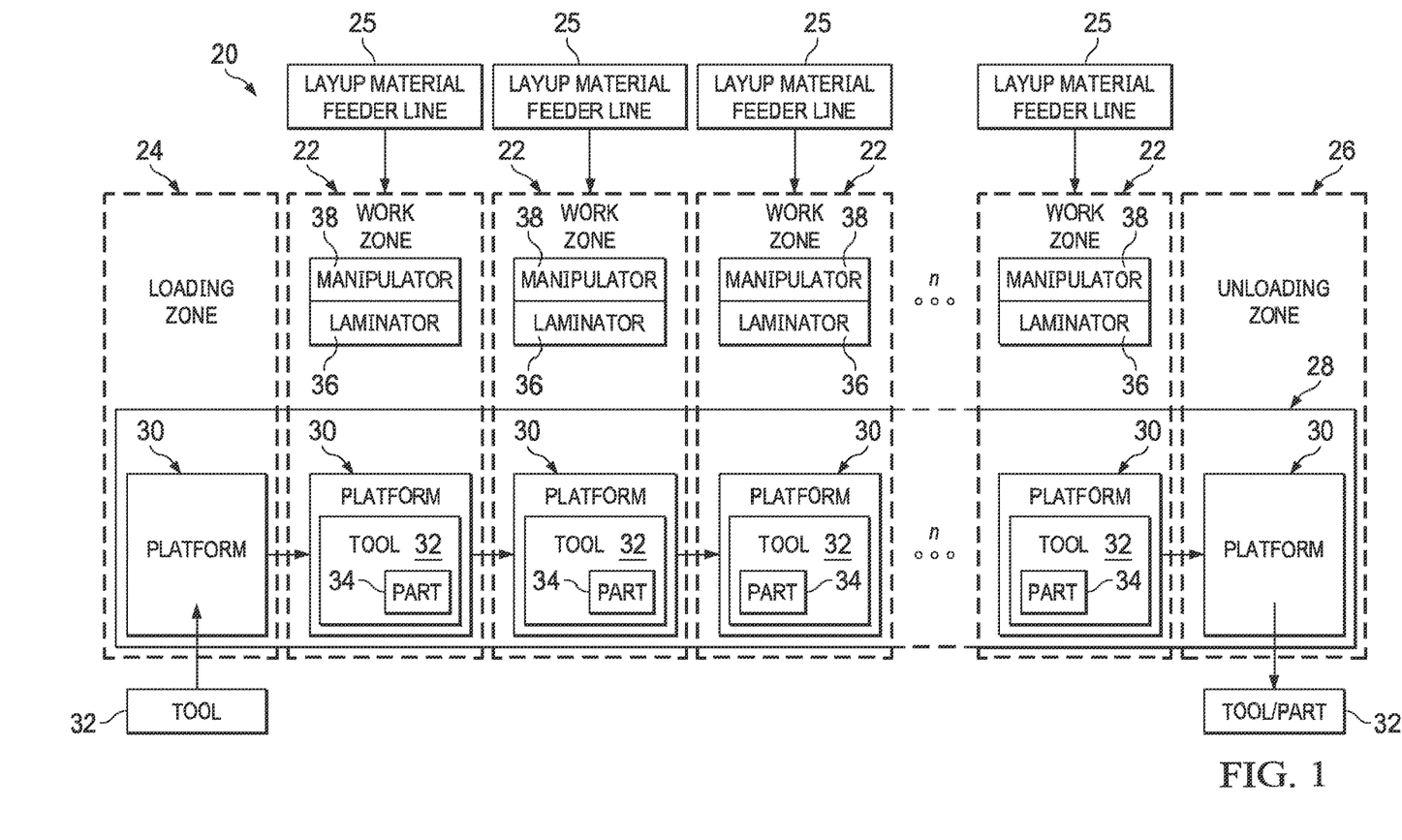
FIG. 1 is an illustration of a block diagram of a continuously moving line for making composite laminate parts.

Referring first to FIG. 1, a production system 20 is used to make composite laminate parts typically comprising multiple plies (not shown) of a fiber reinforced polymer, such as, without limitation, carbon fiber reinforced epoxy. The production system 20 comprises a plurality of work zones 22 arranged serially along a continuously moving line 28. In this example, each of the work zones 22 includes a laminator 36 coupled with a robotic manipulator 38 which may be, for example and without limitation an articulated arm robot, or a gantry robot that controls the movements of a laminator 36 within the work zone 22. As will be discussed below, in some examples, one or more of the work zones 22 may employ multiple laminators 36 that operate cooperatively with each other on the same or different parts within the same work zone 22. Further, operation of laminators 36 in adjacent ones of the work zones 22 may likewise be coordinated such that they may layup portions of the same part at substantially the same time as the part is moving between the adjacent ones of the work zones 22.

Figure 5:
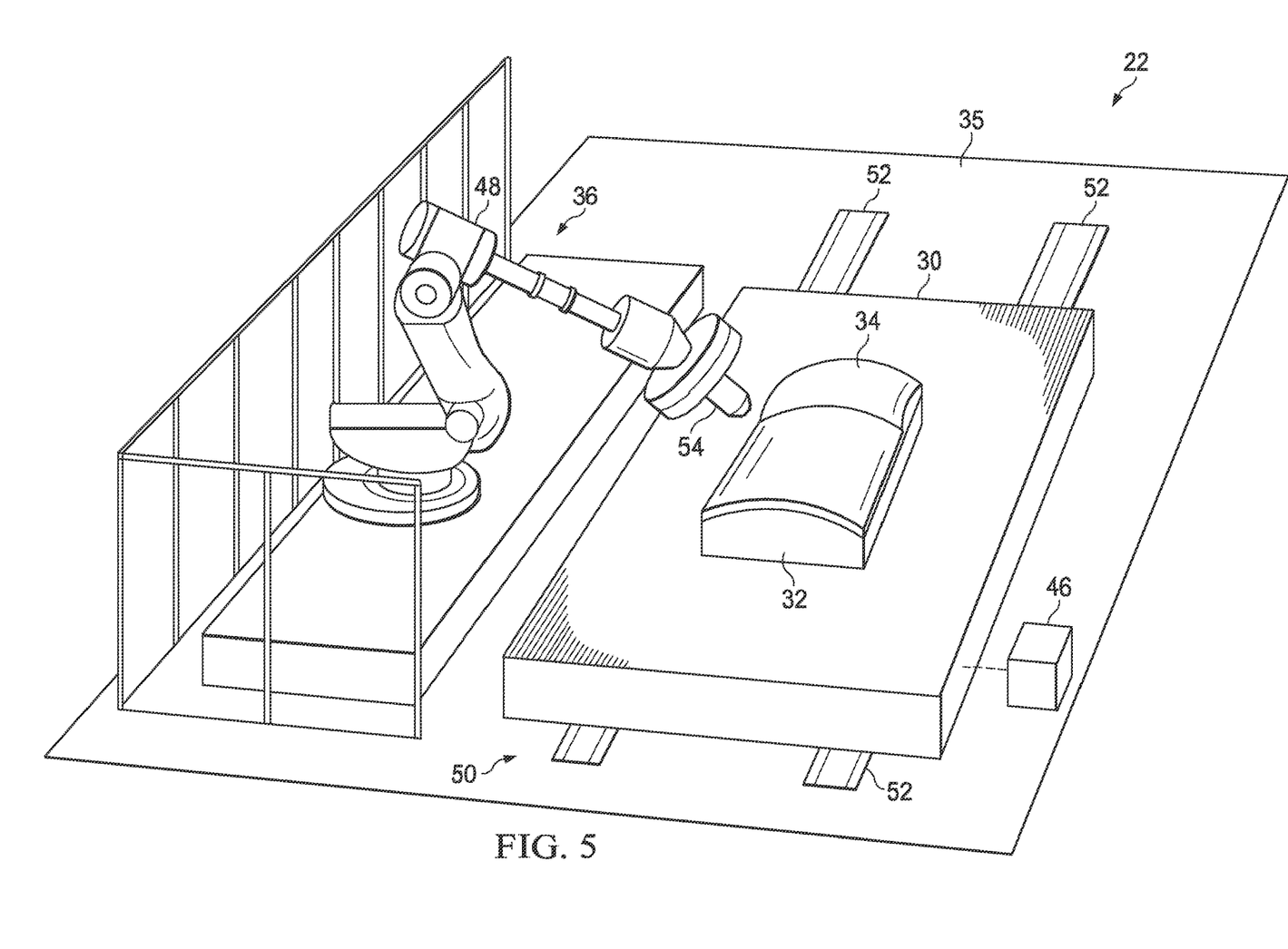
FIG. 5 is an illustration of a perspective view of one example of a work zone along a continuously moving line, employing articulated arm robots for material layup.

A plurality of platforms 30 form part of a continuously moving line 28 that passes through each of n number of the work zones 22. Each of the platforms 30 may comprise any suitable structure capable of being moved and supporting a tool 32 thereon, such as a layup mandrel. In one later describe example, each of the platforms 30 may be an automatic guided vehicle that is self-propelled, and automatically guided, while in another example the platforms 30 are mounted for movement and driven along guides such as tracks 52 (FIG. 5). Each of the parts 34 may comprise a multi-ply fiber reinforced polymer layup that is laid down on the tools 32 by the laminators 36 as the tools 32 move through the work zones 22 along the continuously moving line 28. In one example, laminators 36 in adjacent ones of the work zones 22 may be respectively configured to apply strips of the composite material on the tools 32 having the same angular orientation.

The production system 20 may include a loading zone 24 where the tool 32 is loaded onto one of the platforms 30 in readiness to be moved through the work zones 22. The tools 32 carrying finished parts 34 may be removed from the platforms 30 in an unloading zone 26 at the end of the continuously moving line 28. Layup material may be delivered "just in time" (JIT) to each of the work zones 22 by respectively associated layup material feeder lines 25.

Figure 2:
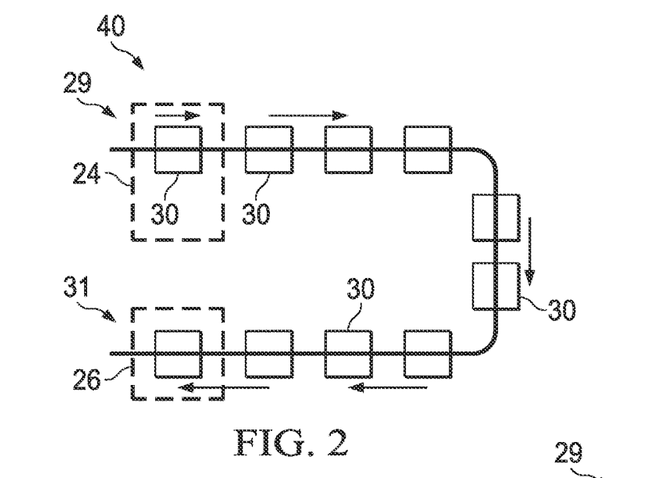
FIGS. 2-4 are illustrations of different layouts of continuously moving lines.
Figure 3:
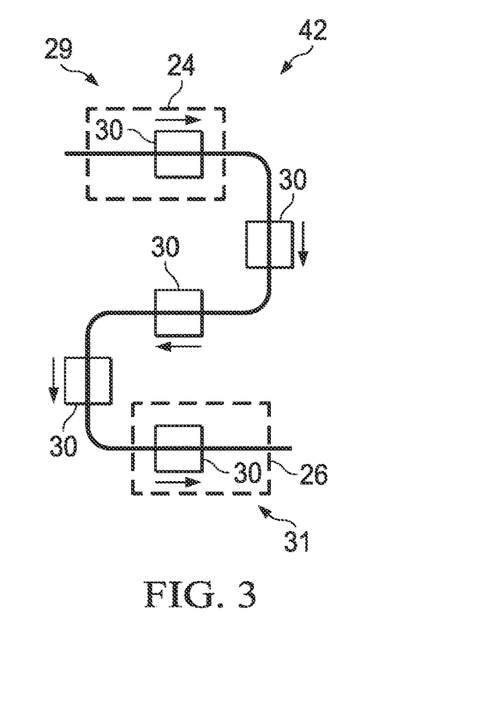
Figure 4:
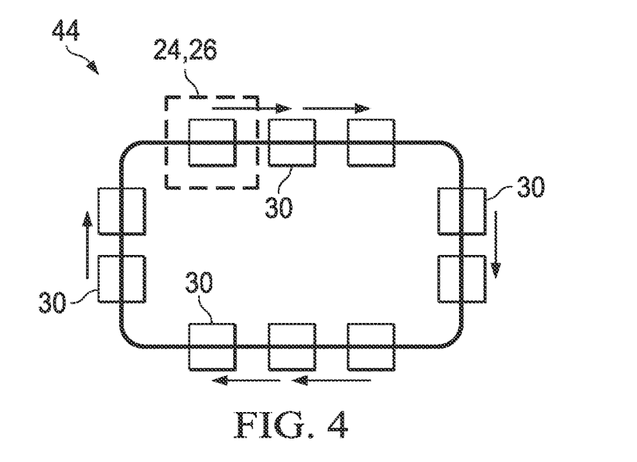

In the example shown in FIG. 1, the work zones are arranged along a substantially straight line, and thus the continuously moving line 28 is likewise straight. However, other geometric arrangements of the work zones 22 are possible. For example, the work zones 22 may be arranged along a U-shaped path 40 as shown in FIG. 2, or a zigzag path 42 as shown in FIG. 3, or an endless path as shown in FIG. 4. The path arrangements shown in FIGS. 2-4 concentrate the work zones 22, thereby reducing floor requirements compared to the linear path arrangement of the work zones 22 shown in FIG. 1. Additional work zones 22 may be added as needed to increase production capacity and/or work density. Alternatively, one or more of the work zones 22 may be deactivated as needed, depending on the application. In the example shown in FIG. 2, a loading zone 24 is located at the beginning 29 of the continuously moving line 28, while an unloading zone 26 is located at the end 31 of the continuously moving line 28. A tool 32 (FIG. 1) such as a layup mandrel may be loaded onto one of the platforms 30 within loading zone 24, and it may be removed from the platform 30 in the unloading zone 26.

Similarly, in the zigzag path example shown in FIG. 3, the continuously moving line 28 likewise has a loading zone 24 at the beginning 29 of the continuously moving line 28 where tools 32 are loaded, and an unloading zone 26 at the end 31 of the continuously moving line 28 where the tools 32 are unloaded. In the endless path configuration 44 shown in FIG. 4, the loading zone 24 and the unloading zone 26 may be located anywhere around the continuously moving line 28, moreover, loading and unloading of the tool 32 may be performed in the same work zone 22. For example, when the platform 30 enters one of the work zones 22, a tool 32 having a completed layup thereon may be removed from that platform 30, and another tool 32 may be loaded onto the same platform 30 in readiness for subsequent lamination operations. In the example shown in FIG. 4, the endless path configuration is rectangularly shaped, however it may have any other shape that may be regular or irregular, depending upon the application. It should also be noted here that in some examples, it may be possible for movement of the continuously moving line 28 to be reversed, such that the platforms 30 move backwardly. For example, once a part 34 has been processed within one or more of the work zones 22, the platforms 30 may move backwardly either for additional processing or for return to the loading zone 24.

In some examples, it may be desirable to move a platform backward to a prior work zone 22 because the prior work zone 22 contains specialized equipment and/or is otherwise better suited to perform a particular lamination operation. The ability to locate the loading zone 24 and the unloading zone 26 at any point along the continuously moving line 28 configuration shown in FIG. 4 allows for greater processing flexibility, and may increase work density while reducing floor space requirements. Continuous line configurations are possible that are well suited to laying up long parts. For example, longer parts may be laid up using two sets of parallel work zones 22, wherein after a part layup is moved in one direction through one set of the work zones 22, the part layup is moved laterally, rather than rotated, to the second set of work zones 22 where the part layup moves in the opposite direction. Work may also be performed on the part lay up as it moves in the opposite direction through the second set of work zones 22. In this latter mentioned example, the leading portion of the part layup as it moves through the first set of work zones 22 becomes the trailing portion of the part layup as it moves through the second set of work zones 22.

Attention is now directed to FIG. 5 which illustrates a typical work zone 22 where part lamination is performed. A platform 30 is mounted on guides 50, such as tracks 52 on a factory floor 35 for movement through the work zone 22 at a controlled rate. At least one sensor 46 senses the position of the platform 30 along the continuously moving line 28. The sensor 46 produces a position signal that is used by a later discussed controller 66 (FIG. 12) to coordinate the operation of the laminators 36 as well as coordinate operation of the laminators with movement of the parts 34. In this example, the laminator 36 comprises a material application head 54 mounted on an articulated arm robot 48. The material application head 54 lays down strips of composite material such as composite tape or tows (not shown) on a tool 32 such as a mandrel. As used herein, the terms applying or laying down composite material on a tool 32 includes laying down composite material on an underlying ply that has already been laid down on the tool 32. As will be discussed below in more detail, the laminator 36 may lay down an entire ply on the tool 32. Alternatively, the laminator 36 may lay down only a portion of the ply. Also, the laminator 36 may lay down a portion of a ply while a laminator 36 in an adjoining work zone 22 in the continuously moving line lays down another portion of the same ply at the same time. The strips of composite material may have differing angular orientations.

Once a laminator 36 has laid down a portion or all of a ply on a tool 32, it may return back to a starting position at the beginning (leading edge) of the work zone in which it is located, in sufficient time to begin laying down composite material on the next-in-line tool 32. Once the laminator 36 returns to its starting position, it may begin laying down portions of a ply on the next-in-line tool 32 that has arrived within its work zone 22, or which is in the process of transitioning from an adjacent work zone 22. As will be discussed below in more detail, operation of the laminators 36 is coordinated or synchronized with movement of the platforms 30 along the continuously moving line 28. Moreover, the operation of the laminators 36 in adjacent work zones 22 is also coordinated such that adjacent laminators 36 are prevented from colliding or otherwise interfering with each other.

Figure 6:
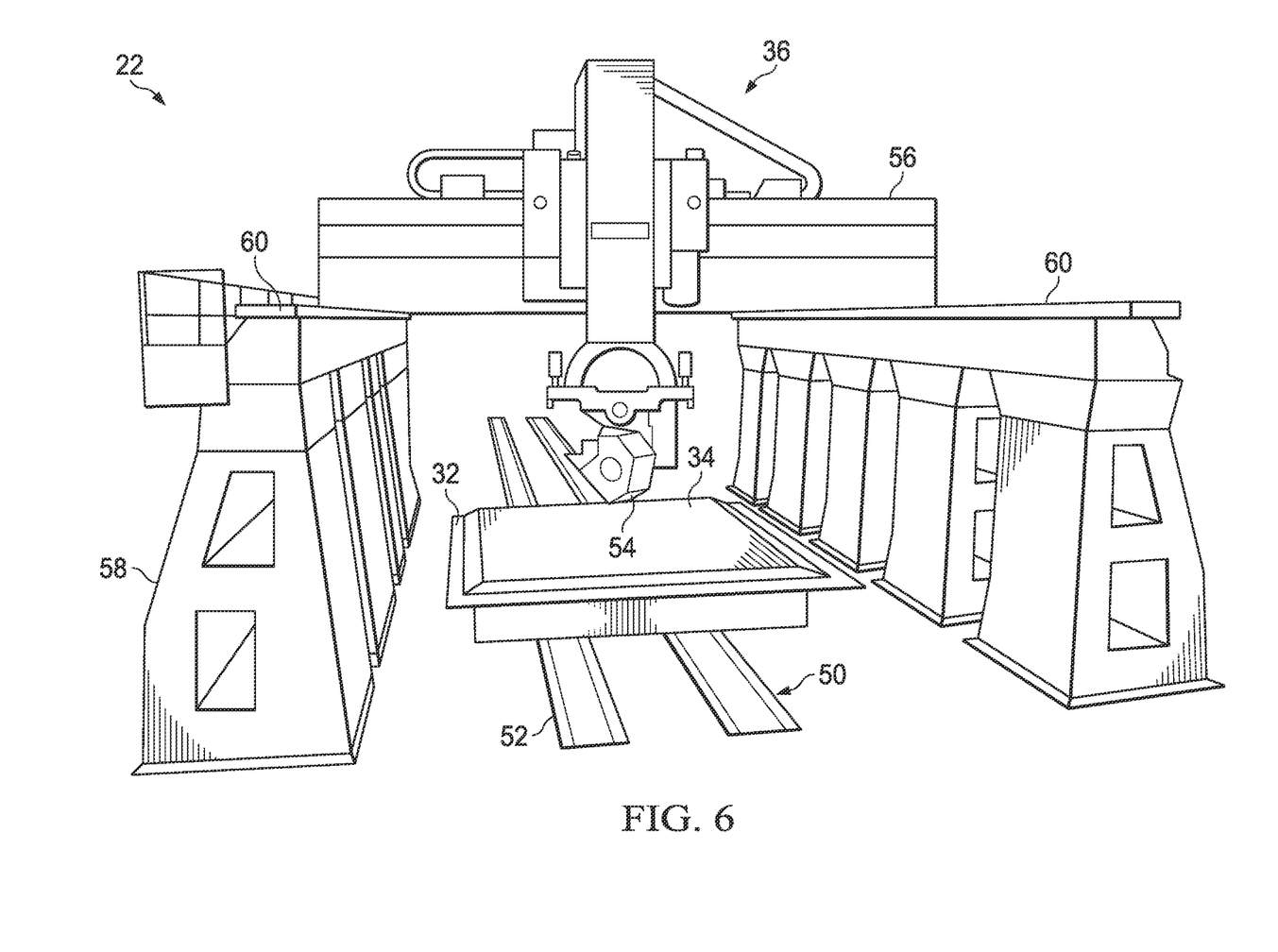
FIG. 6 is an illustration of a perspective view of another example of a work zone along a continuously moving line, employing a gantry robot for material layup.

FIG. 6 illustrates a work zone 22 in which the laminator 36 comprises a material application head 54 mounted on a gantry robot 56. The material application head 54 moves both vertically and laterally on a gantry robot 56. The gantry robot 56 is mounted for longitudinal movement on elevated rails 60 which are in turn mounted on laterally spaced supports 58. In this example, the platform 30 supporting the part 34 moves continuously along tracks 52 or similar guides 50 beneath the material application head 54. As the platform 30 is continuously moving along the tracks 52 through the laminator 36, the material application head 54 lays down composite material on the tool 32, while the controller 66 shown in FIG. 12 coordinates the movement of the platform 30 with the movements of the material application head 54, and also coordinates operation of the laminators with each other. As in the example shown in FIG. 5, in some embodiments, the laminator 36 shown in FIG. 6 may lay down all or only a portion of a ply, while a similar laminator 36 in an adjoining work zone simultaneously lays down another portion of the same ply.

Figure 7:
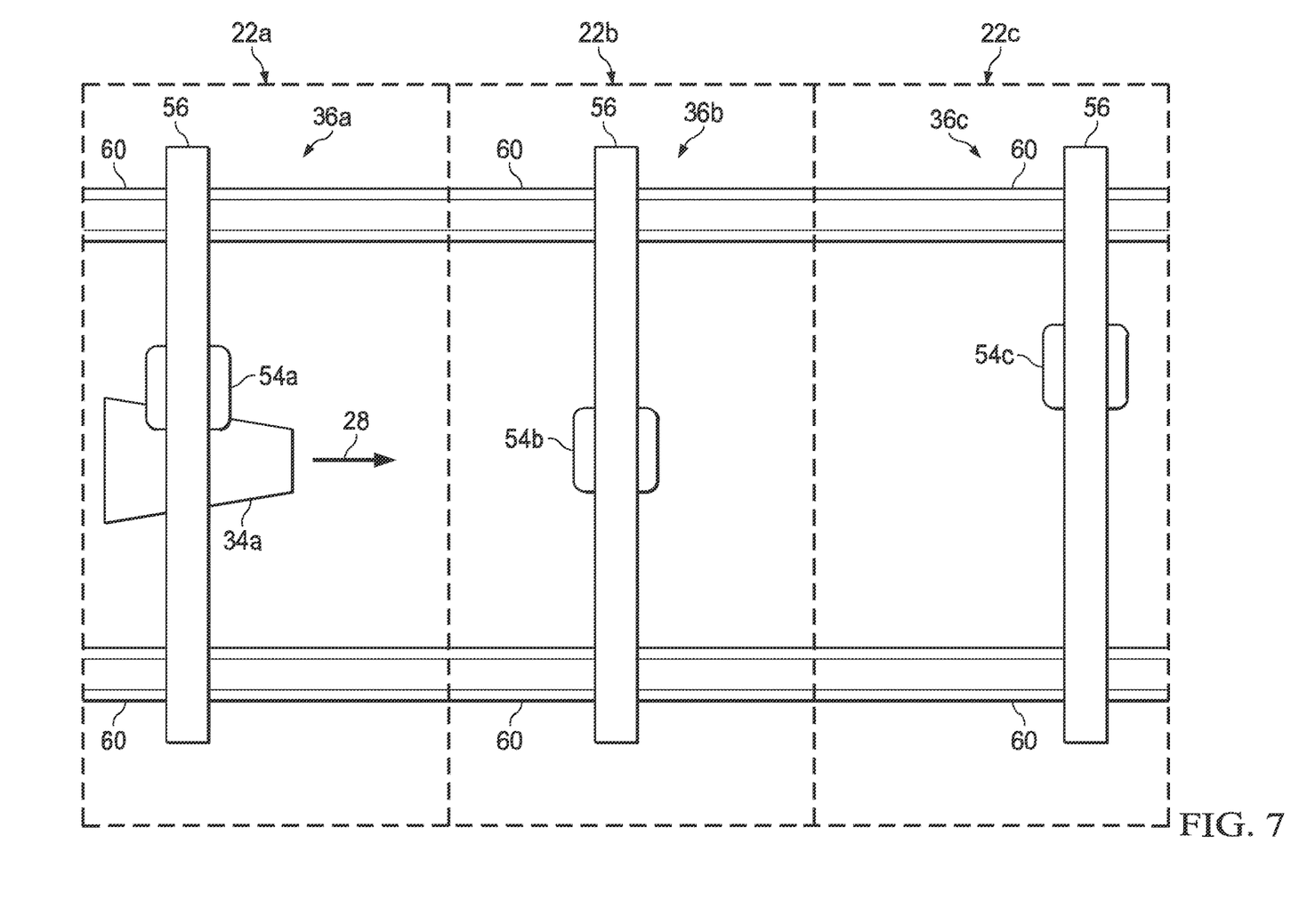
FIGS. 7-11 are illustrations of diagrammatic plan views of three adjacent work zones in which lamination operations are carried out, showing the progressive movement of parts through the work zones.

Attention is now directed to FIGS. 7-11, which illustrate how composite laminate parts 34 may be made with increased production efficiency using a continuously moving line 28, and multiple laminators 36 arranged in adjacent work zones 22. Three exemplary adjacent work zones 22a, 22b, 22c are shown which respectively contain three laminators 36a, 36b, 36c. The laminators 36a, 36b, 36c respectively include composite material application heads 54a, 54b, 54c mounted on gantry robots 56 that are each movable along rails 60 within the corresponding work zone 22. Each of the laminators 36a, 36b, 36c may lay down all or only a portion of a ply on a part 34a which passes through these work zones on the continuously moving line 28. For simplicity of illustration, the platform 30 on which the part 34a is supported is not shown in FIGS. 7-11. In FIGS. 7-11, the work zones 22a, 22b, 22c are substantially equal in length, however in other examples, these and other of the work zones 22 may not have equal lengths. Further, the platforms 30 (not shown in FIGS. 7-11) may not move along the continuously moving line 28 at a constant rate. Rather, the rate at which the platforms 30 move through work zones 22 may vary. For example, the platform 30 may carry a part 34 through work zone 22b at a rate that is faster than the rate at which it is carried through work zone 22a, while the platform 30 may carry a part 34 through work zone 22c at a rate that is slower than the rate at which it carries the part 34 through work zone 22a In FIG. 7, it can be seen that laminator 36a is in the process of laying down composite material on the part 34a as it moves from left to right through zone 22a. Laminator 36a may begin to lay down composite material on part 34a as it begins entering the work zone 22a, or at any point while the part 34a is within the work zone 22a, or while the part 34a is transitioning from work zone 22a to work zone 22b. Thus, as shown in FIG. 7, the transition to the next work zone 22 involves coordinated movement of the composite material application heads 54a and 54b laying material on the part 34. This coordination also involves avoiding any interference such as collisions between adjacent the composite material application heads 54a, 54b. The composite material application head 54a may start a last ply on the leading edge before the material application head 54b progresses toward the trailing edge as the material application head 54b starts a new ply on the leading edge. In another example, the composite material application head 54a may lay up the aft portion of the top of the part 34a while material application head 54b lays up material from the splice forward. Other types of laminate placements between the composite material application heads 54a and 54b and the parts 34 are also possible.

Figure 8:
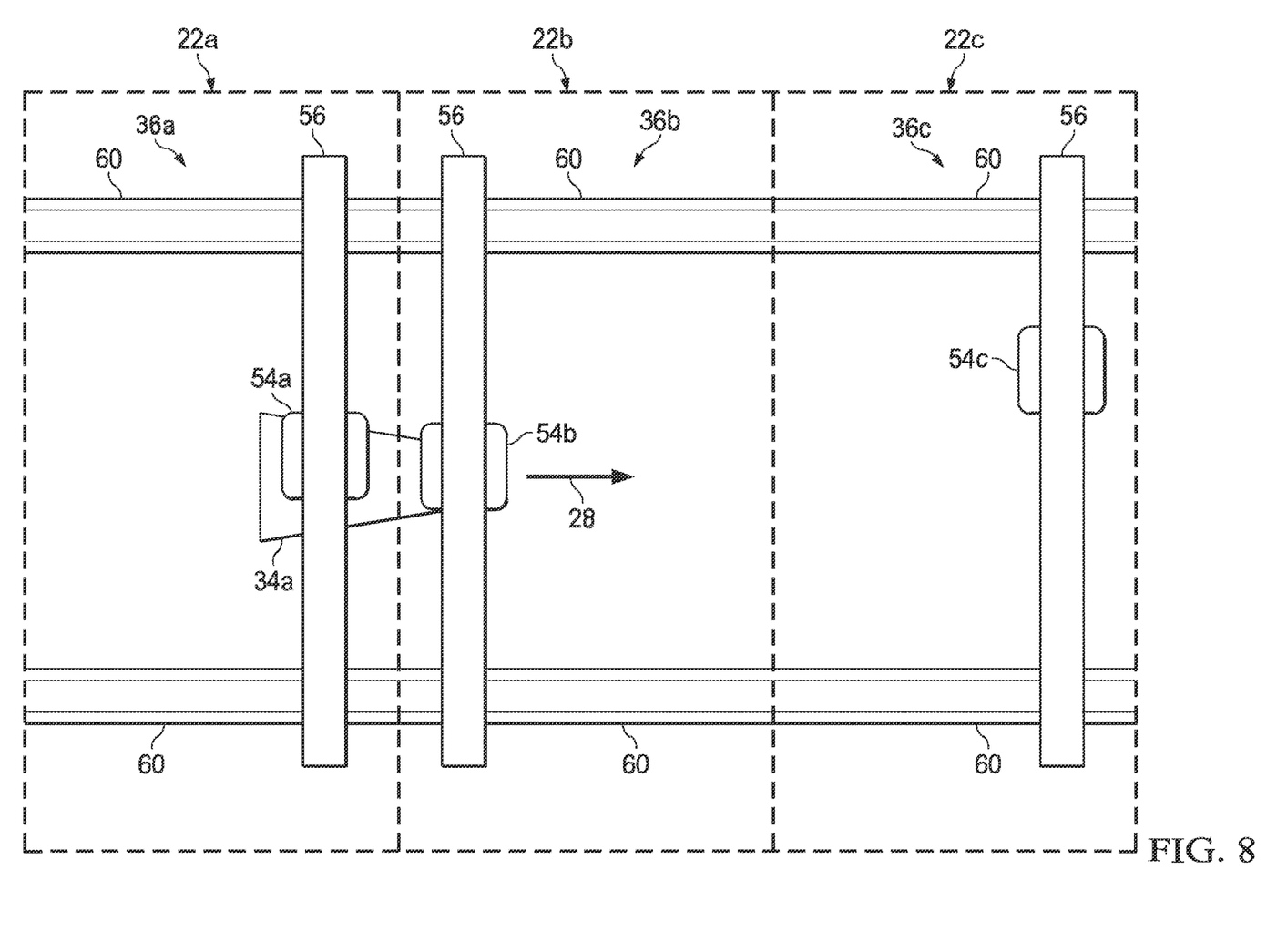

FIG. 8 shows the part 34a having advanced in the continuously moving line 28, such that it spans a portion of the work zone 22a and a portion of work zone 22b. As the part 34a passes from work zone 22a to work zone 22b, laminator 36b begins laying down composite material on part 34a, while at the same time laminator 36a is also laying down composite material on part 34a. Thus, a laminator 36a in a work zone 22 may lay down composite material on one portion of a part, while a laminator 36b in an adjoining work zone 22 may lay down composite material on another portion of the part. In some applications, laminator 36b may be laying down portions of the next ply while in other applications, laminator 36b may be completing lay down of the ply that was partially laid down by laminator 36a. The orientation of the laminate being laid up may differ from work zone 22 to work zone 22. Thus, for example, the orientation of the material applied in work zone 22a may be 0 degrees, and in work zone 22b the orientation of the material may 45 degree, while in work zone 22c the material may have an orientation of 90 degrees. The orientation of the composite material being applied may have any angular orientations in any of the work zones 22. In other words, laminators 36 in different ones of the work zones 22 may apply strips of composite material on the tools 32 having differing angular orientations. As indicated previously, the operation and movements of the laminators 36 are coordinated so that they may lay down composite material on the same part 34 at the same time, without interfering or colliding with each other.

Figure 9:
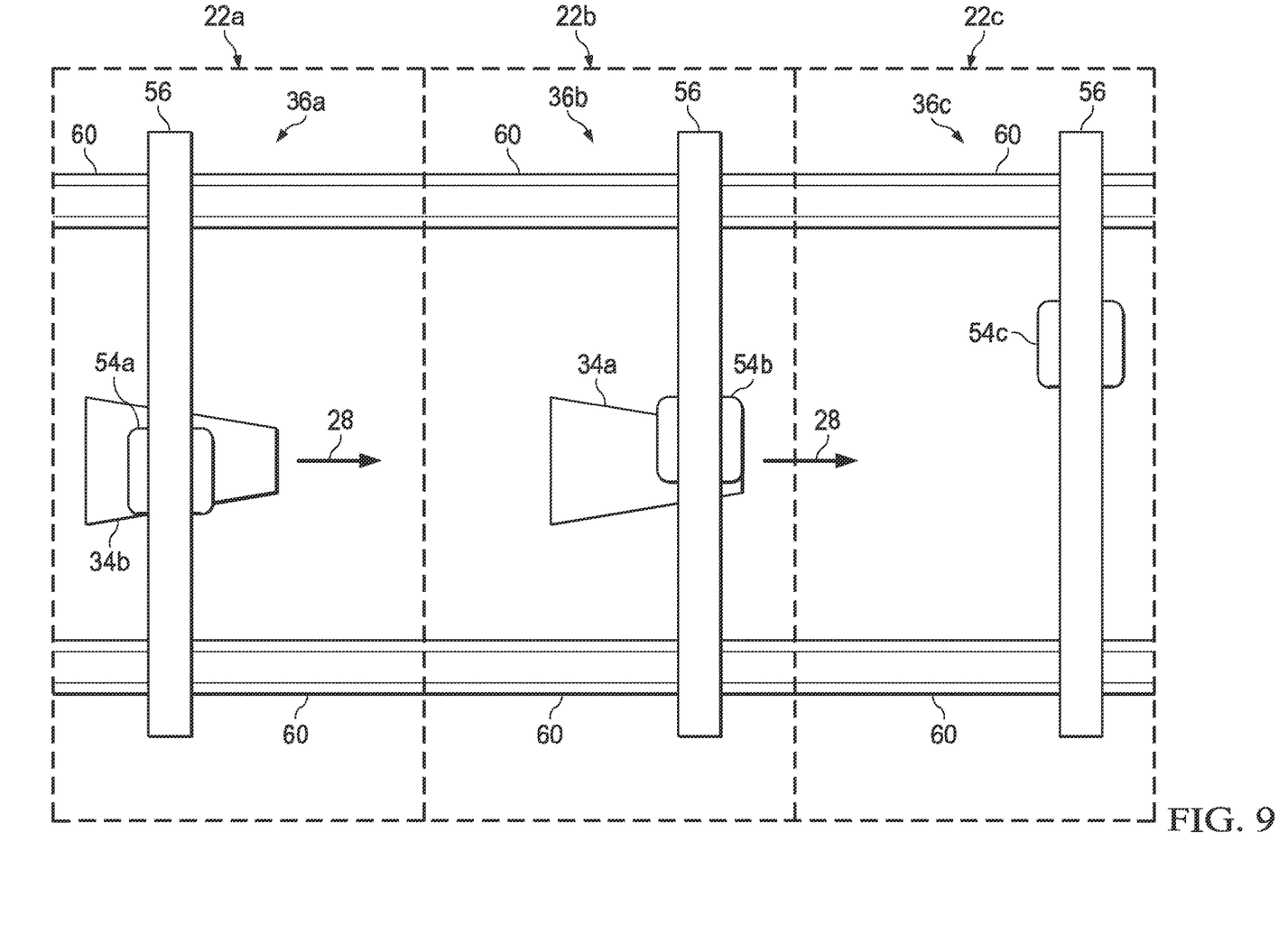

FIG. 9 shows part 34a having advanced from left to right further into work zone 22b where the laminator 36b completes lay down of composite material on part 34a. Simultaneously, a second part 34b has entered work zone 22a where laminator 36a begins laying down composite material on part 34b.

Figure 10:
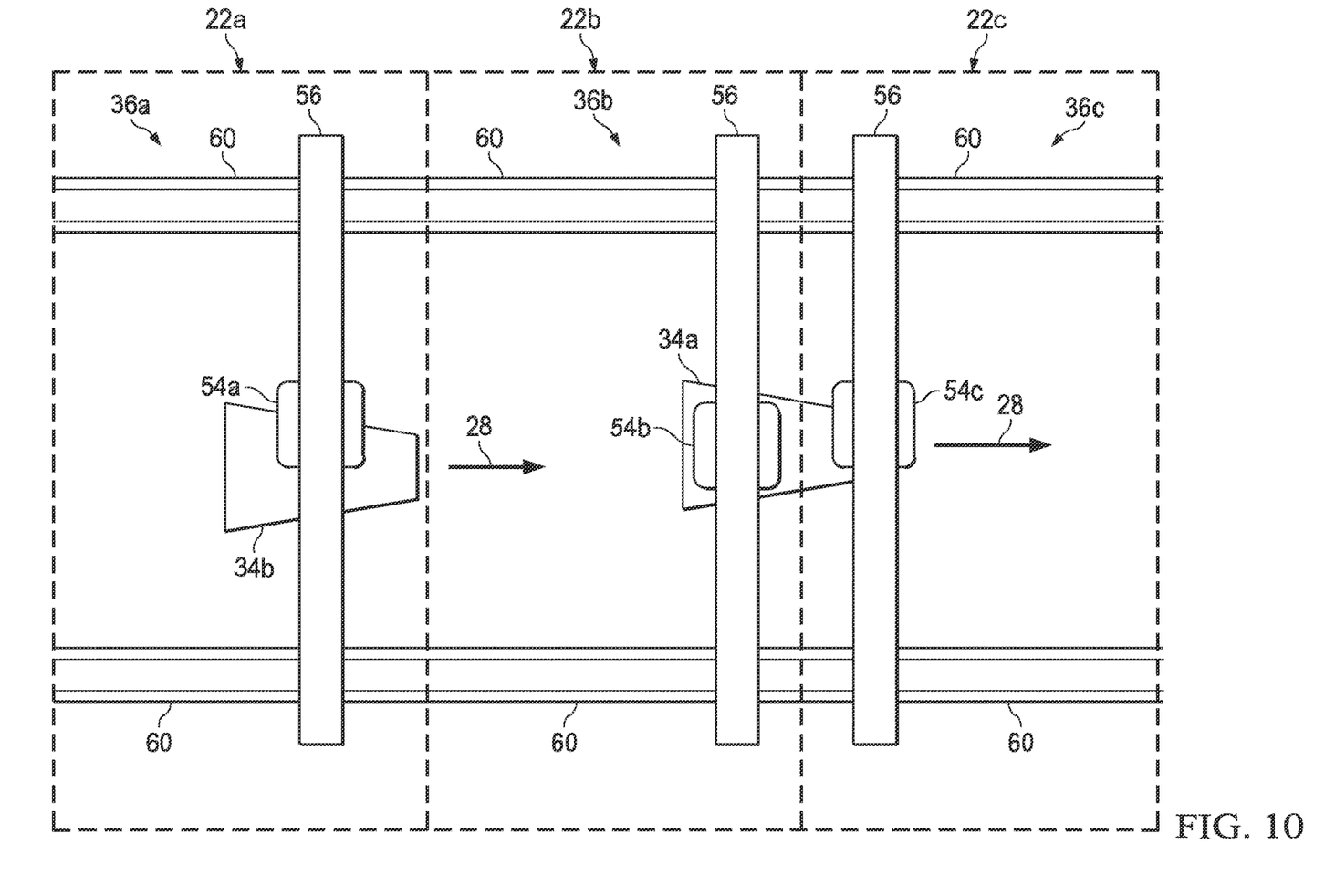

In FIG. 10, both parts 34a and 34b have advanced from left to right in the continuously moving line 28, and part 34a has partially transitioned into work zone 22c where laminator 36c begins laying down composite material on part 34a, while laminator 36b is completing lay down of composite material on part 34a. Laminator 36a may begin to lay down a material on part 34b, either before the part 34b enters the work zone 22a, or at any point while the part 34b is within the work zone 22a or while the part 34b is transitioning from work zone 22a to work zone 22b. Thus, it can be seen again that the transition to the next work zone 22 involves coordinated movement of the material application heads 54b and 54c laying material on the part 34a. The material application head 54b may start a last ply on the leading edge before the material application head 54c progresses toward the trailing edge as the material application head 54c starts a new ply on the leading edge. In another example, the material application head 54b may lay up the aft portion of the top of the part 34a while material application head 54c lays up material from the splice forward. Other types of laminate placements between the material application heads 54b and 54c and the part 34a are also possible. When laminator 36b completes laying down composite material on part 34a, it returns to the beginning of work zone 22b in readiness to lay down composite material on next-in-line part 34b.

Figure 11:
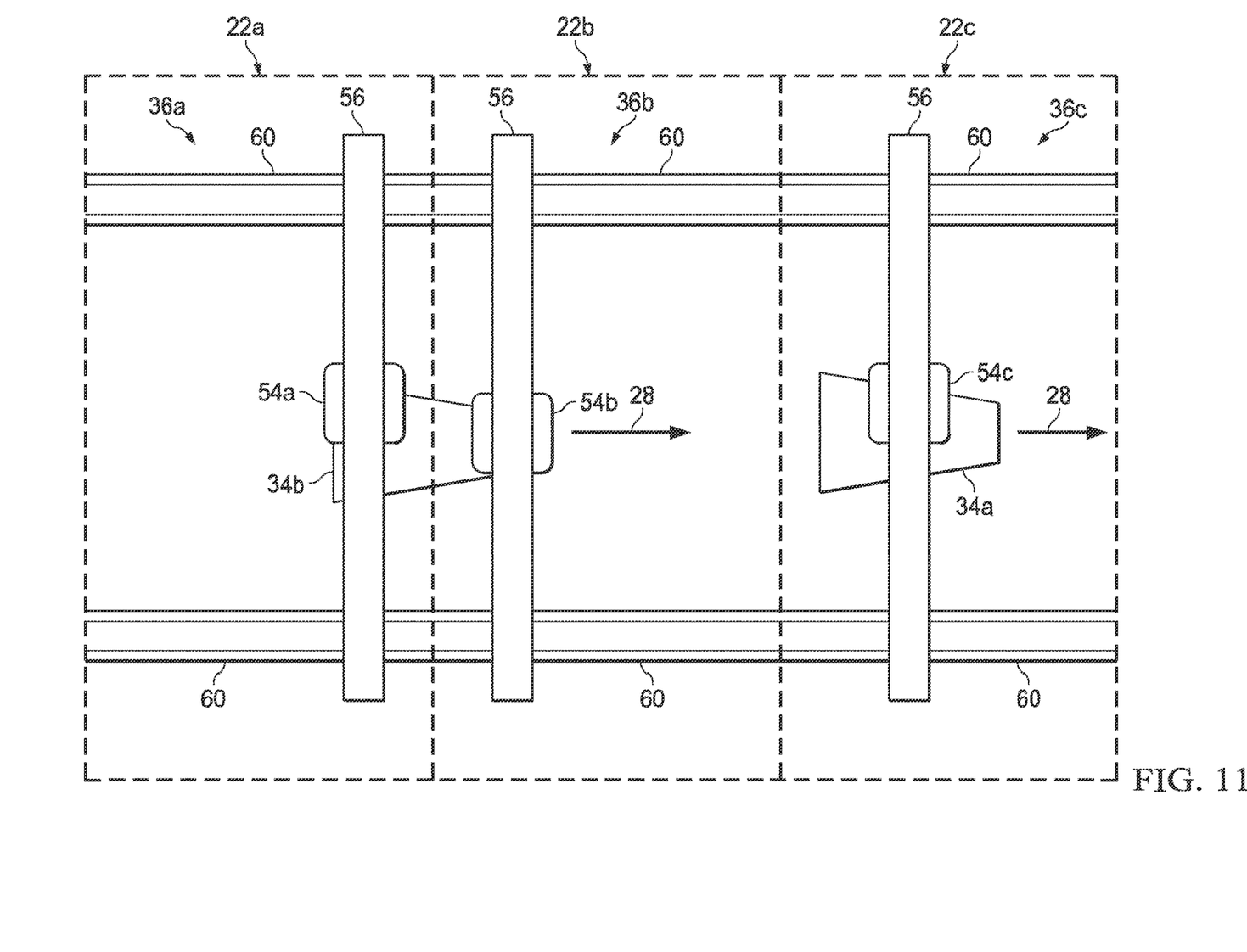

In FIG. 11, it can be seen that part 34a has fully entered into work zone 22c, while part 34b has advanced partially into work zone 22b. At this point, both laminators 36a and 36b are laying down composite material on part 34b. The sequence continues as additional parts move continuously through work zones 22a, 22b, and 22c, and the operation of the laminators 36a, 36b, 36c is coordinated in a manner that allows two adjacent laminators 36 to lay down composite material on the same part 34 at the same time, in the manner discussed above in connection with FIGS. 8 and 10. In each case, the laminator 36a, 36b, 36c returns to its starting position at the beginning (far left) of the work zone 22 in readiness to beginning laying down composite material on the next in line part 34.

Figure 12:
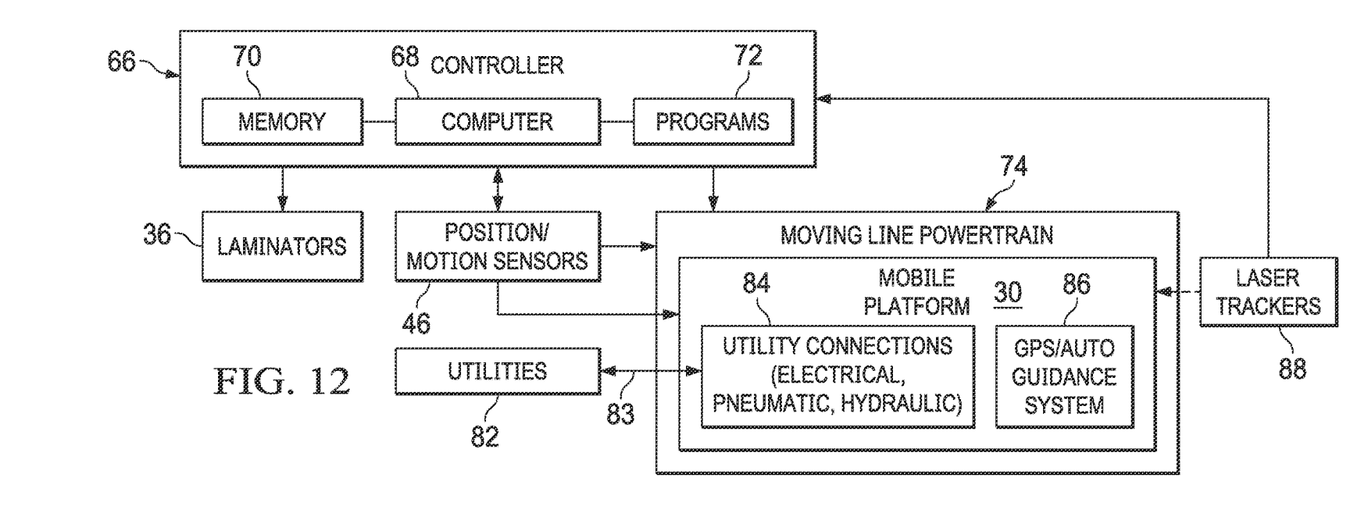
FIG. 12 is an illustration of a block diagram generally showing control components of the continuously moving line.

Attention is now directed to FIG. 12, which broadly illustrates control components of the production system 20 (FIG. 1). The controller 66 coordinates and controls operation of the laminators 36 and movement of the platforms 30 along the continuously moving line 28. The controller 66 also coordinates operation of the laminators 36 in examples where a portion of a ply applied by a laminator 36 in one work zone 22, and another portion of the same ply applied by a laminator 36 in an adjacent work zone 22. The controller 66 may comprise a computer 68 which is coupled with suitable memory 70 and control programs 72. In one example, the platform 30 may be driven along a continuously moving line 28 by a moving line powertrain 74 which is controlled by the controller 66. In this example, the platform 30 may include appropriate utility connections 84 such as commercially available quick-connects 83, which may include electrical, pneumatic and hydraulic quick disconnects that couple the platform 30 with external source of utilities 82. In other examples, as previously mentioned, the platform 30 may comprise automated guided vehicle (AGV) that may have on board utilities, as well as a Global Positioning System (GPS) and automated guidance system 86. In still other examples, the movement of the platform 30 may be controlled using laser trackers 88. A suitable sensor 46, for example position and/or motion sensors, coupled with the controller 66 are used to determine the position of the platforms 30 as well as the moving line powertrain 74.

Figure 13:
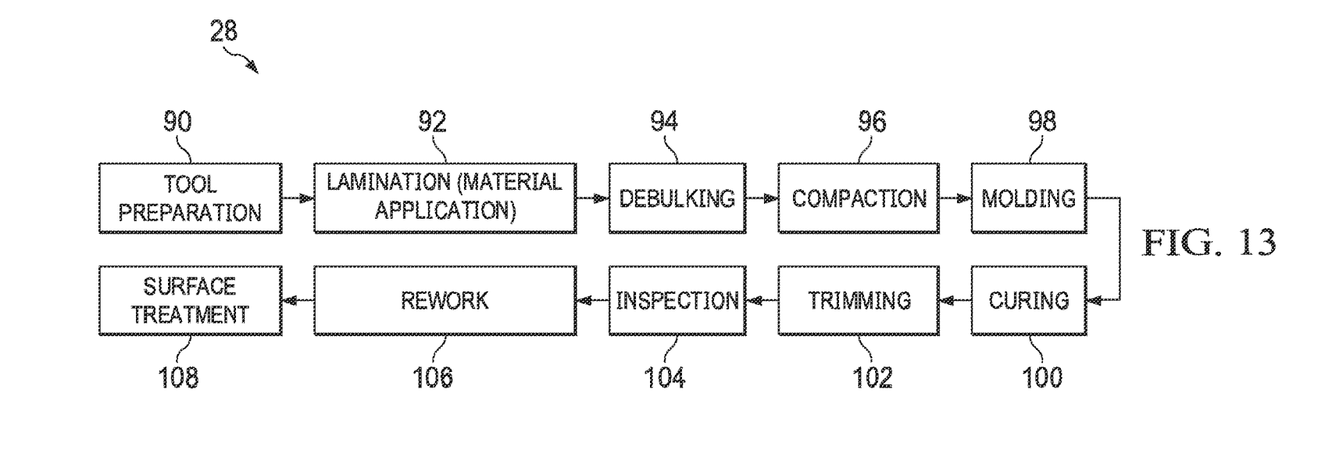
FIG. 13 is an illustration a block diagram of another example of a continuously moving line.

In the previous examples, the work zones 22 are dedicated to lamination operations, however, principles of the continuously moving line 28 described above may include other types of operations that are normally required in the production of composite laminate parts. FIG. 13 illustrates an example of a continuously moving line 28 that incorporates a variety of operations that may be required in the production of composite laminate parts. For example, a work zone 22 may include tool preparation 90 involving cleaning of or application of coatings to a tool 32, following which the tool 32 is transported on a platform 30 to one or more work zones 22 where lamination operations 92 are formed. The fully laid up part 34 may then be delivered on the continuously moving line 28 to downstream work zones 22 where debulking 94 and compaction 96 of the part layout are performed.

Debulking the part 34 at 94 may be carried out by vacuum compaction using, for example and without limitation, a vacuum bag. Compacting the part 34 at 96 may also be carried out using vacuum compaction utilizing a vacuum bag or a vacuum bag and a caul plate. Further, the part 34 may be processed in additional work zones where molding the part 98, curing 100, trimming 102, inspection 104, rework 106 and/or surface treatment 108 operations may be performed. Molding the part 34 at 98 may be carried out using precure forming, and/or a combination of molding between one side of the tool 32 and/or a combination of molding between one side of the tool 32 and a caul plate on the other side of the tool 32. Curing the part 34 at 100 may be carried out using either autoclave or out-of-autoclave processing. Post cure trimming of the cured part 34 at 102 may occur either before or after the part 34 is removed from the tool 32. In some applications, the trimming process may involve a type of mass trimming of the part 34 before it is cured, followed by more specific trimming after the part 34 has been cured. Inspection of the part 34 at 104 may include visual inspection as well as inspection using NDI (nondestructive inspection) equipment. Although reworking the part 34 at 106 along the continuously moving line 28 is possible, in some cases the part 34 may not require rework. At 108, one or more surfaces of the part 34 may be treated using any of various techniques. For example, the surface treatment may involve sealing trimmed edges and/or painting one or more surface areas of the part 34.

Figure 14:
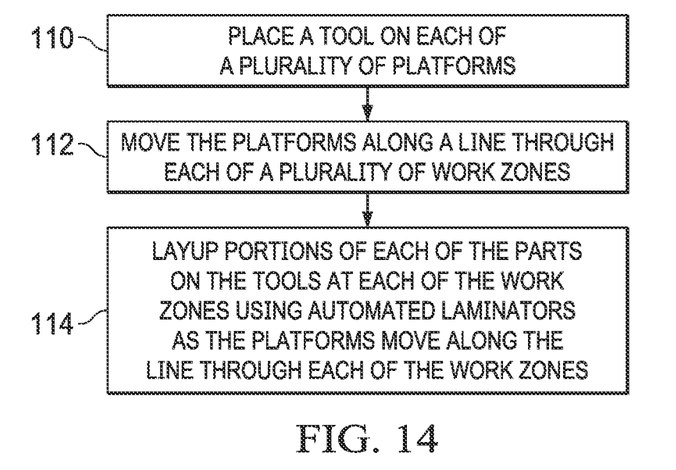
FIG. 14 is an illustration of a flow diagram of one example of a method of making composite laminate parts using the continuously moving line.

FIG. 14 broadly illustrates the steps of one method of making composite laminate parts using a continuously moving line 28. Beginning at 110, a tool 32 is placed on each of a plurality of platforms 30. At 112, the platforms 30 are moved along the continuously moving line through each of a plurality of work zones 22. At 114, portions of each of the parts 34 are laid up on the tools 32 at each of the work zones 22 using automated laminators 36 as the platforms 30 move along the continuously moving line through each of the work zones 22.

Figure 15:
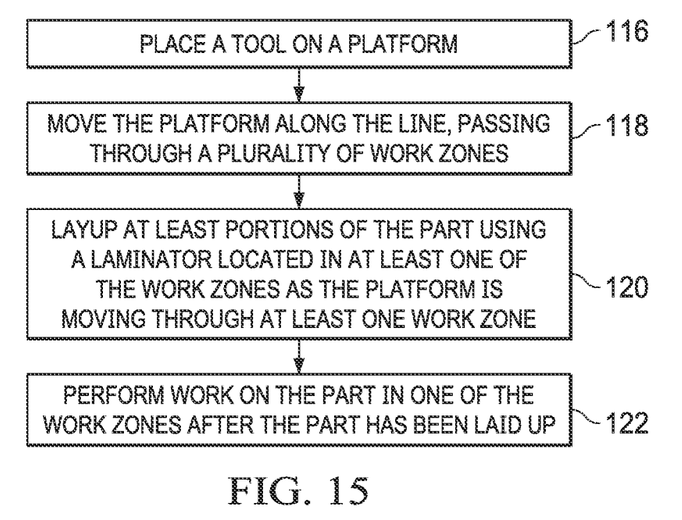
FIG. 15 is an illustration of a flow diagram of another example of a method of making a composite laminate part using a continuously moving line.

FIG. 15 broadly illustrates the steps of another method of making composite laminate parts using a continuously moving line. At 116, a tool 32 is placed on a platform 30. At 118, the platform 30 is moved along a continuously moving line, passing through a plurality of work zones 22. At 120, portions of the part 34 are laid up using laminators 36 located in adjacent ones of the work zones 22. At 122, work is performed on the part 34 in one of the work zones 22 after the part 34 has been laid up. This work may comprise one or more of the operations or processes shown in FIG. 13 after the part 34 has been laid up.

Figure 16:
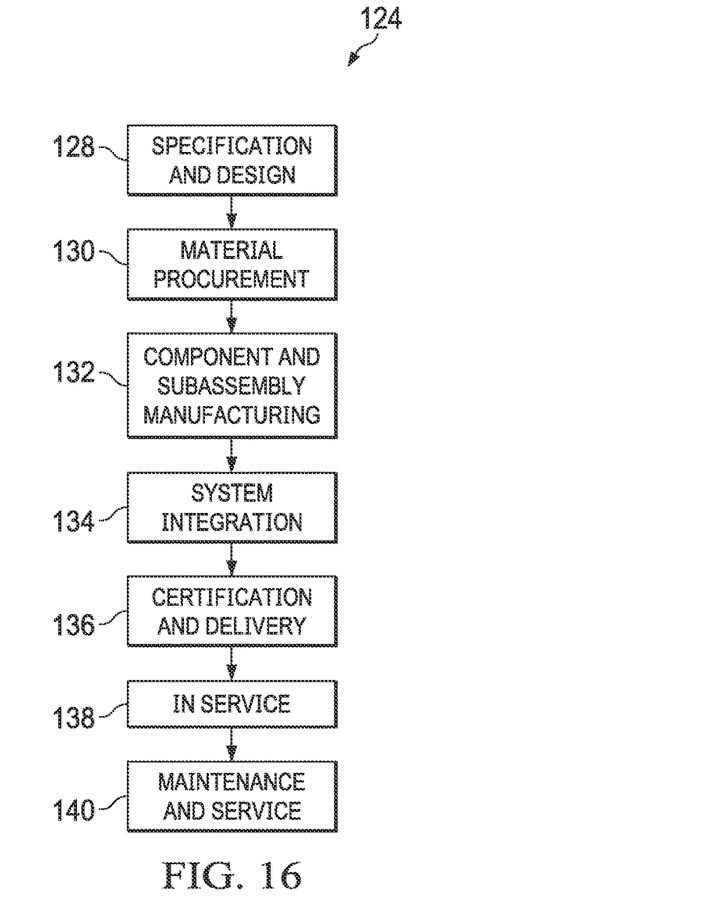
FIG. 16 is an illustration of a flow diagram of aircraft production and service methodology.
Figure 17:
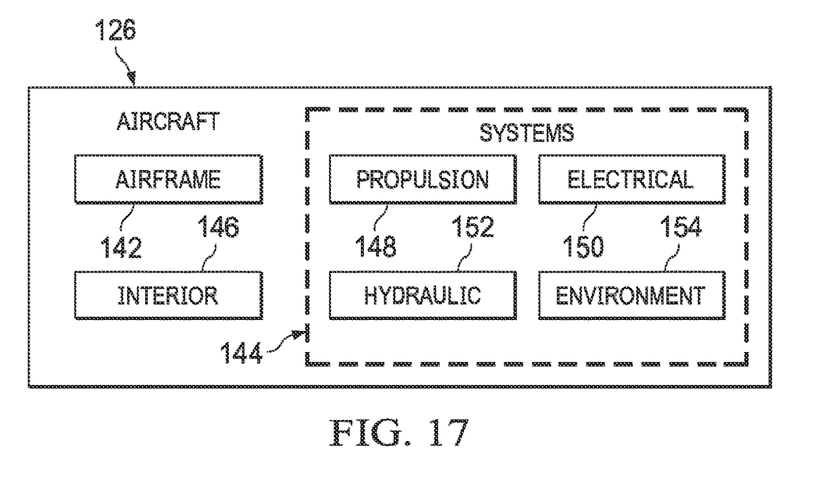
FIG. 17 is an illustration of a block diagram of an aircraft.

Examples of the disclosure may find use in a variety of potential applications, particularly in the transportation industry, including for example, aerospace, marine, automotive applications and other application where composite laminate parts may be used. Thus, referring now to FIGS. 16 and 17, examples of the disclosure may be used in the context of an aircraft manufacturing and service method 124 as shown in FIG. 16 and an aircraft 126 as shown in FIG. 17. Aircraft applications of the disclosed examples may include a variety of composite parts and structures that are formed from laminated plies of a fiber reinforced polymer. During pre-production, aircraft manufacturing and service method 124 may include specification and design 128 of the aircraft 126 and material procurement 130. During production, component and subassembly manufacturing 132 and system integration 134 of the aircraft 126 takes place. Thereafter, the aircraft 126 may go through certification and delivery 136 in order to be placed in service 138. While in service by a customer, the aircraft 126 is scheduled for routine maintenance and service 138, which may also include modification, reconfiguration, refurbishment, and so on. The disclosed system and method may be used to produce composite laminate parts used in production processes component and subassembly manufacturing 132 and system integration 134 shown in FIG. 16, as well as in the airframe 142 forming part of the airplane shown on FIG. 17.

Each of the processes of aircraft manufacturing and service method 124 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 126 produced by aircraft manufacturing and service method 124 may include an airframe 142 with a plurality of systems 144 and an interior 146. Examples of systems 144 include one or more of a propulsion system 148, an electrical system 150, a hydraulic system 152 and an environmental system 154. Any number of other systems may be included. Although an aerospace example is shown, the principles of the disclosure may be applied to other industries, such as the marine and automotive industries.

Systems and methods embodied herein may be employed during any one or more of the stages of the aircraft manufacturing and service method 124. For example, components or subassemblies corresponding to component and subassembly manufacturing 132 may be fabricated or manufactured in a manner similar to components or subassemblies produced while the aircraft 126 is in service. Also, one or more apparatus examples, method examples, or a combination thereof may be utilized during the production processes component and subassembly manufacturing 132 and system integration 134, for example, by substantially expediting assembly of or reducing the cost of an aircraft 126. Similarly, one or more of apparatus examples, method examples, or a combination thereof may be utilized while the aircraft 126 is in service, for example and without limitation, to maintenance and service 140.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of making composite laminate parts, comprising:
   moving a plurality of platforms, each of the plurality of platforms carrying one of a plurality of tools, continuously along a line passing through each of a plurality of work zones; and
   laying up at least a portion of each of a plurality of composite laminate parts on each of the plurality of tools at each of the plurality of work zones as the plurality of platforms and the plurality of tools move continuously along the line through the plurality of work zones,
   wherein laying up at least the portion of each of the plurality of composite laminate parts includes using a plurality of laminators located in a pair of adjacent work zones to lay down composite material on different portions of a single part of the plurality of composite laminate parts at a same time as a single tool of the plurality of tools that carries the single part moves between the pair of adjacent work zones, and
   wherein laying up at least the portion of each of the plurality of composite laminate parts includes using a first of the plurality of laminators located in a first work zone of the pair of adjacent work zones while a trailing edge of the single tool is located in the first work zone at the same time as using a second of the plurality of laminators located in a next work zone of the pair of adjacent work zones while a leading edge of the single tool is located in the next work zone of the pair of adjacent work zones.

2. The method of claim 1, wherein laying up portions of each of the plurality of composite laminate parts includes using the laminators in different ones of the plurality of work zones to apply strips of composite material on the plurality of tools with differing angular orientations.

3. The method of claim 1, further comprising: placing the plurality of tools respectively on the plurality of platforms.

4. The method of claim 3, wherein:
   moving the plurality of platforms includes guiding the plurality of platforms along the line, and
   laying up portions of each of the plurality of composite laminate parts includes coordinating operation of the laminators with movement of the plurality of platforms along the line.

5. The method of claim 3, wherein moving the plurality of platforms along the line is performed continuously, such that the plurality of platforms are continuously moving along the line through the plurality of work zones.

6. The method of claim 3, wherein moving the plurality of platforms includes automatically guiding the plurality of platforms along the line.

7. The method of claim 1, wherein moving the plurality of tools along the line is performed continuously such that the plurality of tools move continuously through the plurality of work zones.

8. The method of claim 1, wherein using the plurality of laminators at each of the plurality of work zones includes:
   moving a material application head over the plurality of tools,
   using the material application head to lay down composite material on the plurality of tools as the plurality of tools is moving through the plurality of work zones.

9. The method of claim 1, wherein laying up at least a portion of each of the plurality of composite laminate parts includes using the plurality of laminators to lay down composite material on a leading edge of the single tool at a point within a single work zone of the plurality of work zones, and using the plurality of laminators to lay down composite material on a trailing edge of the single tool at another point within the single work zone.

10. The method of claim 1, wherein laying up at least a portion of each of the plurality of composite laminate parts includes:
using a single laminator in a single work zone of the plurality of work zones to lay down composite material on the single tool just before a leading edge of the single tool passes into a next work zone that is next in line after the single work zone, and continuing to lay down composite material on the single tool up to a trailing edge of the single tool.

11. The method of claim 1, wherein moving the plurality of tools along the line includes moving the plurality of tools along an endless path.

12. The method of claim 1, wherein moving the plurality of tools along the line includes moving the plurality of tools along a U-shaped path.

13. The method of claim 1, wherein the moving the plurality of tools along the line includes moving the plurality of tools along a zigzag shaped path.

14. A method of making a composite laminate part, comprising:
moving a plurality of platforms, each of the plurality of platforms carrying one of a plurality of tools, continuously along a line passing through each of a plurality of work zones; and
laying up at least a portion of the composite laminate part on one of the plurality of tools at each of the plurality of work zones as the plurality of platforms and the plurality of tools move continuously along the line through the plurality of work zones,
wherein laying up at least a portion of the composite laminate part includes laying up a first portion of the composite laminate part using a first laminator located in a first of the plurality of work zones while a second laminator in an adjacent second of the plurality of work zones is laying up a second portion of the composite laminate part that is different compared to the first portion of the composite laminate part, and
wherein laying up at least the portion of the composite laminate part includes using the first laminator located in a first of the plurality of work zones while a trailing edge of the one of plurality of tools is located in the first of the plurality of work zones while using the second laminator located in the adjacent second of the plurality of work zones while a leading edge of the one of the plurality of tools is located in the adjacent second of the plurality of work zones.

15. The method of claim 14, further comprising placing the plurality of tools respectively on the plurality of platforms.

16. The method of claim 15, wherein laying up at least the portion of the composite laminate part includes moving material application heads over the plurality of tools as the plurality of tools move through the plurality of work zones.

17. The method of claim 15, wherein laminators located in adjacent ones of the plurality of work zones respectively lay down strips of composite material on the plurality of tools having differing orientations.

18. The method of claim 15, wherein performing work on the composite laminate part includes at least one of:
debulking the composite laminate part,
compacting the composite laminate part,
molding the composite laminate part,
curing the composite laminate part,
trimming the composite laminate part,
inspecting the composite laminate part,
reworking the composite laminate part, and
treating a surface of the composite laminate part.

19. The method of claim 14, wherein laying up at least a portion of the composite laminate part includes using the first laminator to lay down composite material on a leading edge of the one of the plurality of tools at a point within the first of the plurality of work zones, and using the first laminator to lay down composite material on a trailing edge of the one of the plurality of tools at another point within the first of the plurality of work zones.

20. The method of claim 14, wherein laying up portions of the composite laminate part includes:
using the first laminator in the first of the plurality of work zones to lay down composite material on the one of the plurality of tools just before a leading edge of the one of the plurality of tools passes into a next work zone that is next in line after the first of the plurality of work zones, and continuing to lay down composite material up to a trailing edge of the one of the plurality of tools.

* * * * *